March 27, 1934.   R. G. FERRIS   1,952,126
PIPE SECTION AND ATTACHMENT THEREFOR
Filed May 18, 1933
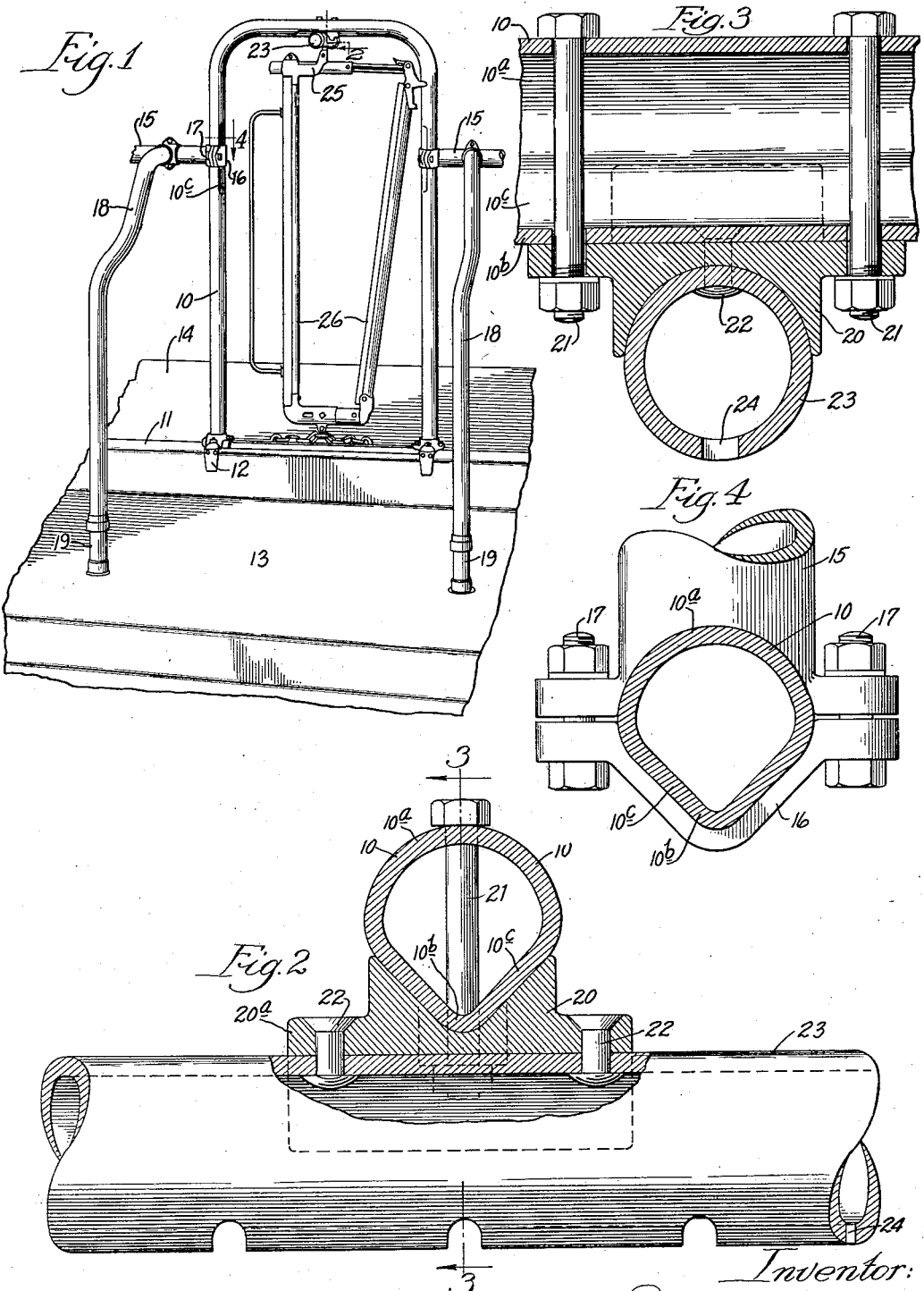

Patented Mar. 27, 1934

1,952,126

UNITED STATES PATENT OFFICE 1,952,126

PIPE SECTION AND ATTACHMENT THEREFOR

Robert G. Ferris, Harvard, Ill., assignor to Starline Inc., Harvard, Ill., a corporation of Illinois Application May 18, 1933, Serial No. 671,674

2 Claims. (Cl. 287—54)

An object of this invention is to provide an improved section of pipe adapted particularly for use in cattle stalls and the like which readily lends itself to attachment with various kinds of fittings for this and similar purposes.

Heretofore round pipe has generally been used for this purpose, but a great deal of trouble and dissatisfaction has arisen from the fact that attachments are difficult to properly anchor thereto and have a tendency to come loose and shift position on the pipe.

This invention overcomes these difficulties and is fully described in the following specification and shown in the accompanying drawing, in which—

Figure 1 is a rear perspective of a cattle stall embodying the invention;

Fig. 2 is an enlarged partial section on the line 2 of Fig. 1;

Fig. 3 is a partial vertical section on the line 3—3 of Fig. 2; and

Fig. 4 is a horizontal section on the line 4 of Fig. 1.

The embodiment illustrated comprises a stall of a well known type having a tubular U-shaped stall front 10 secured to a curb 11 in any well known manner, as by means of clamps 12. The stall has a floor 13 terminating in the curb, in front of which is an upwardly inclined manger 14, all preferably formed of concrete.

The stall fronts are spaced at regular distances apart, these distances being fixed by the lengths of connecting bars 15 which have fittings 16 secured thereto by means of bolts 17, or the like. A partition 18 is secured at its forward end to each of the connecting bars in a similar manner, and while the rear end is anchored in the concrete floor at 19.

The novel feature of this stall is the shape of the pipe of the U-shaped front at the points where the fittings are applied. This is shown particularly in Fig. 4. Here the tubular front 10 has a half round portion 10$^a$ while the opposite side 10$^b$ is made V-shaped or angular. The pipe is preferably formed into this shape from round pipe by cold pressing it at intervals so that the section thus formed extends a few inches on each side of the point where the fitting is to be applied.

The end of the bar 15 is then rounded to fit the round portion of the pipe 10$^a$, as shown in Fig. 4, while the fitting 16 fits the V-shaped portion, so that when the bolts 17 are drawn tight the fitting 16 prevents the pipe and bar from moving relative to each other, thereby anchoring them firmly together. The stall front is similarly formed at 10$^c$ (Fig. 2) to receive the saddle fitting 20 which is secured thereto by means of bolts 21. This fitting has laterally extending ears 20$^a$ having holes through which pass rivets or the like 22 by which it is secured to a horizontal cross member 23, which in the present instance is an adjustable device for aligning the cow with respect to the gutter at the back.

This cross member has a longitudinal slot 24 in the bottom in which slides a pin carried by the upper portion 25 of the stanchion 26. This pin and adjusting device form no part of the present invention, and consequently are not shown or described in detail. This cross member, however, carries the weight of the stanchion, and in addition has to take the force of the cow lunging forward and back in the stanchion, and frequently comes loose because of the difficulty of properly anchoring it to the stall front. That difficulty, however, is overcome in the present instance by forming the pipe at the top of the stall front into the front of a V so that the saddle 20 can be firmly anchored thereto.

While in the embodiment illustrated the pipe is preferably round and formed or "bumped" into the V-shape at intervals, it will be understood that, if desired, the pipe may be formed throughout its length into the cross sectional shape as shown in Fig. 2, wherein one-half the section is round, while the other is V-shaped. This may be done either by rolling or pressing a round pipe into this shape either hot or cold, or it may be done by forming the pipe from a sheet and pressing it into the desired form at any stage, after which it is rolled into tubular form and butt welded in any well known manner.

The partition member 18 is secured to the connecting bar 15 in the same way that the connecting bar is secured to the vertical leg of the stall front, the connecting bar having the same cross section as that of the tubular stall front of Fig. 4.

Thus it will be seen that a very simple, inexpensive and satisfactory means is provided for attaching together tubular members such as are used in building up cow stalls, and the like. Nor is the invention limited to the form of cow stall illustrated in which each stall has a separate front, but is adapted to be used wherever a tubular member or a fitting is secured to a pipe section.

While I have shown and described but a few embodiments of my invention, it is to be understood that it is capable of many modifications. Changes, therefore, in the construction and arrangement may be made which do not depart from the spirit and scope of my invention as disclosed by the appended claims.

I claim:

1. In a frame structure, connected pipe sections disposed at an angle to each other, means for preventing relative rotation of said sections, one of said sections comprising a pipe having a cross section which is partly round and partly V-shaped, a fitting shaped to conform to the V-shaped portion of the pipe, and means connecting together said fitting and pipe sections, whereby to hold said pipe sections in non-rotative relationship.

2. In a frame structure, connected pipe sections disposed at an angle to each other, means for preventing relative rotation of said sections, one of said sections comprising a pipe having a cross section which is partly circular and partly made up of substantially flat surfaces which are located at an angle to each other, the periphery of the section being substantially equal to the circumference of a round pipe having the same radius as the round part of the section, a fitting shaped to conform to said angularly disposed flattened surfaces, and means connecting together said fitting and pipe sections, whereby to hold said pipe sections in non-rotative relationship.

ROBERT G. FERRIS.